US009360218B2

(12) United States Patent
Rullaud et al.

(10) Patent No.: US 9,360,218 B2
(45) Date of Patent: Jun. 7, 2016

(54) INJECTION DEVICE FOR A COMBUSTION CHAMBER OF A TURBINE ENGINE

(71) Applicant: SNECMA, Paris (FR)

(72) Inventors: Matthieu Francois Rullaud, Champagne sur Seine (FR); Galadriel Dancie, Crisenoy (FR); Romain Nicolas Lunel, Montereau sur le Jard (FR); Thomas Olivier Marie Noel, Brunoy (FR)

(73) Assignee: SNECMA, Paris (FR)

( * ) Notice: Subject to any disclaimer, the term of this patent is extended or adjusted under 35 U.S.C. 154(b) by 329 days.

(21) Appl. No.: 14/039,408

(22) Filed: Sep. 27, 2013

(65) Prior Publication Data
US 2014/0090381 A1 Apr. 3, 2014

(30) Foreign Application Priority Data

Sep. 28, 2012 (FR) ...................................... 12 59234

(51) Int. Cl.
F23R 3/20 (2006.01)
F23R 3/14 (2006.01)
F23R 3/34 (2006.01)
F23R 3/28 (2006.01)

(52) U.S. Cl.
CPC ... F23R 3/20 (2013.01); F23R 3/14 (2013.01); F23R 3/286 (2013.01); F23R 3/343 (2013.01); Y02T 50/675 (2013.01)

(58) Field of Classification Search
CPC .............. F23R 3/04; F23R 3/10; F23R 3/12; F23R 3/20; F23R 3/14; F23R 3/286; F23R 3/343; F23R 3/34
USPC .................... 60/740, 742, 746, 747, 748, 734
See application file for complete search history.

(56) References Cited

U.S. PATENT DOCUMENTS

| 6,367,262 | B1 * | 4/2002 | Mongia | F23R 3/14 60/748 |
| 6,418,726 | B1 | 7/2002 | Foust et al. | |
| 7,114,337 | B2 * | 10/2006 | Cazalens | F23R 3/286 60/202 |
| 7,779,636 | B2 * | 8/2010 | Buelow | F23R 3/14 60/742 |
| 2007/0157616 | A1 * | 7/2007 | Hernandez | F23D 11/36 60/740 |
| 2007/0289305 | A1 * | 12/2007 | Oda | F23D 11/383 60/748 |
| 2008/0289340 | A1 * | 11/2008 | Oda | F23R 3/28 60/737 |
| 2008/0302105 | A1 * | 12/2008 | Oda | F23R 3/28 60/737 |
| 2010/0308135 | A1 | 12/2010 | Yamamoto et al. | |

FOREIGN PATENT DOCUMENTS

FR 2 958 015 A1 9/2011

OTHER PUBLICATIONS

Preliminary Search Report issued May 17, 2013 in French Patent Application No. FR 1259234 FA 770123 (with English translation of Category of Cited Documents).

* cited by examiner

Primary Examiner — Steven Sutherland
(74) Attorney, Agent, or Firm — Oblon, McClelland, Maier & Neustadt, L.L.P.

(57) ABSTRACT

A fuel injection device is provided. The device includes a pilot injector opening out into a venturi and an annular row of multipoint injection orifices opening out axially in a downstream direction and radially outside the venturi, the venturi being connected at its downstream end to a separation wall. The outer peripheral edge of the separation wall has a diameter greater than the diameter of the annular row of injection orifices, whereby the separation wall forms a thermal protection screen for these orifices against heat radiation coming from the chamber.

14 Claims, 3 Drawing Sheets

INJECTION DEVICE FOR A COMBUSTION CHAMBER OF A TURBINE ENGINE

BACKGROUND OF THE INVENTION

1. Field of the Invention

The present invention relates to a "multipoint" fuel injection device for an annular combustion chamber of a turbine engine such as an airplane turboprop or turbojet.

2. Description OF the Related Art

In known manner, a turbine engine has an annular combustion chamber arranged at the outlet from a high pressure compressor and provided with a plurality of fuel injection devices that are regularly distributed circumferentially at the inlet to the combustion chamber. A "multipoint" injection device has a venturi within which a pilot injector is mounted, the pilot injector being centered on the axis of the venturi and being fed continuously by a pilot circuit, there being a second venturi that is coaxial with the first and that surrounds it. The second venturi has an annular chamber at its upstream end that is fed with fuel by a fuel circuit and that delivers the fuel to injection orifices that open out axially in a downstream direction.

The pilot circuit delivers a continuous flow of fuel that is optimized for low speeds, and the multipoint circuit delivers an intermittent flow of fuel that is optimized for high speeds.

Nevertheless, a major drawback of using the multipoint circuit intermittently is that, under the effect of the high temperatures due to the radiation from the flame in the combustion chamber, such intermittent use leads to clogging or coking of the stagnant fuel inside the multipoint circuit while it is not operating. These phenomena can lead to coke forming in the fuel injection orifices of the multipoint circuit, thereby impeding or reducing the spraying and homogenization of the fuel by the multipoint circuit and thus impeding or reducing the operation of the combustion chamber, or even potentially completely plugging the orifices.

To mitigate that drawback, various different technologies have already been proposed as described in documents EP-A1-2 026 002, EP-A1-2 488 791, EP-A1-2 488 792, and WO-A1-2012/104523.

BRIEF SUMMARY OF THE INVENTION

The present invention proposes a simple alternative or complement to the above-described technologies that makes it possible to counter the above-mentioned coking problem in effective manner.

To this end, the invention provides a fuel injection device for an annular combustion chamber of a turbine engine, the device comprising a pilot circuit feeding an injector leading into a venturi, and a multipoint circuit feeding an annular row of injection orifices leading, axially (i.e. parallel to the longitudinal axis of the injection device) downstream and radially towards the outside of the venturi, the venturi being connected at its downstream end to an annular separation wall for separating combustion zones produced respectively by the pilot circuit and by the multipoint circuit, the device being characterized in that the outer peripheral edge of the separation wall has a diameter greater than the diameter of the above-mentioned annular row of orifices, such that the separation wall forms a thermal protection screen for these orifices against the heat radiation coming from the combustion chamber.

According to the invention, the injection orifices of the multipoint circuit are protected from radiation from the flame in the combustion chamber by the separation wall of the venturi that extends downstream facing these orifices. This makes it possible to limit the temperature rise of the multipoint circuit due to the above-mentioned radiation, and thus to reduce the risks of fuel coking and of the injection orifices becoming shut off.

Advantageously, the separation wall is substantially frustoconical and flares downstream.

When the injection device has two coaxial venturies, respectively an inner venturi and an outer venturi, the outer venturi may be connected to a separation wall of the above-specified type that forms a thermal protection screen.

In an embodiment of the invention, the injection orifices are formed in a frustoconical wall situated at the upstream end of the venturi and formed integrally with the venturi. The diameter of the outer peripheral edge of the separation wall is preferably substantially equal to the outer diameter of the above-mentioned frustoconical wall such that said frustoconical wall is protected thermally by the separation wall.

The separation wall may be of thickness that decreases going from upstream to downstream.

The device may include a frustoconical bowl surrounding the venturi. The larger-diameter downstream end of the bowl and the outer peripheral edge of the separation wall may be situated substantially in the same transverse plane.

The multipoint circuit operates on the principle of not producing any flame at low speed, when only the flame generated by the pilot circuit is present. In order to control the emission of polluting gas (such as carbon monoxide CO or unburnt fuel $C_xH_y$) at low speed, it is necessary to separate the flows in the pilot and multipoint combustion zones. To do this, the downstream end of the second venturi of the injection device is connected to a substantially frustoconical wall that flares downstream and that serves to separate the above-mentioned zones. In order to improve that separation, one solution would consist in increasing the axial size of the wall. However that solution is not advantageous since the separation wall would then be more exposed to high temperatures in the combustion chamber and would run the risk of being damaged. A technical problem is to find a compromise between an axial dimension for the wall that is sufficient to perform the above-mentioned separation function but that is also limited in order to avoid the wall being subjected in operation to thermal stresses that are too great.

In addition, at low speed, it is found that droplets of fuel coming from the pilot injector penetrate into the multipoint combustion zone where the air flow rate is relatively large, thereby leading to poor combustion of the fuel (incomplete chemical reactions) and to polluting emissions.

An aspect of the solutions presented herein serves to remedy these drawbacks, at least in part, and in a manner that is simple, effective, and inexpensive.

To this end, the invention proposes that the venturi should comprise an internal cavity fed with air and communicating with at least one annular row of first air-passing orifices opening out in a radially inner wall of the venturi.

In operation, a flow of air (possibly at high speed) passes through the orifices of the venturi in order to control the flows of liquid fuel coming from the pilot injector and in order to prevent any of this fuel being introduced into the multipoint combustion zone. This flow of air also serves to shear the fuel droplets from the pilot injector, thereby improving atomization and evaporation of the fuel. The gaseous fuel is thus made available more quickly for participating in combustion.

The solution presented above also makes it possible to keep the pilot and multipoint combustion zones apart by creating an annular air-recirculation space between the above-mentioned zones. Finally, it enables the transit time of the fuel droplets in the flame tube to be lengthened, thereby encouraging fuel evaporation. Overall, this leads to better combustion of the fuel and to a reduction in the emission of polluting gas.

Advantageously, the venturi is connected at its downstream end to the substantially frustoconical separation wall between the combustion zones produced respectively by the pilot and multipoint circuits, and the first orifices are formed in the vicinity of this separation wall.

The cavity of the venturi may communicate with at least one annular row of second air-passing orifices formed in a downstream annular wall of the cavity, these orifices opening out upstream from the separation wall in order to cool it. The downstream wall may be substantially radial or frustoconical (e.g. oriented outwards going from upstream to downstream).

The above-presented solution is then particularly advantageous since, using a single technology, it makes it possible both to cool the separation wall and also to improve the separation between the combustion zones of the pilot and multipoint circuits. The separation wall is cooled by the air delivered by the orifices fed by the internal cavity of the venturi. In addition to cooling the separation wall, the air delivered by those orifices flows along the separation wall and penetrates into the combustion chamber with a radial component that enables it to keep the flows coming from the multipoint circuit away from the axis of the combustion area in the combustion chamber and thus to participle in the above-mentioned separation of the flows coming from the pilot and multipoint circuits.

The air-passing orifices are preferably distributed regularly on a circumference centered on the longitudinal axis of the device. They may be substantially axial in orientation. In a variant, they may be oriented, from upstream to downstream, radially inwards and/or they may be substantially perpendicular to the separation wall.

The air-passing orifices are preferably formed in a downstream annular wall of the internal cavity of the venturi. The radially inner end of this annular wall may be connected to the upstream end of the separation wall. The radially outer end of the annular wall may be connected to the downstream end of a substantially cylindrical outer wall of the inner cavity, the upstream end thereof being surrounded by the injection orifices of the multipoint circuit.

The downstream outlets of the air-passing orifices are preferably situated at a short distance from the separation wall so that the air delivered by these orifices impacts against the separation wall. The downstream outlets of the orifices may be situated facing the inner periphery of the separation wall.

The invention also provides an annular combustion chamber for a turbine engine, the combustion chamber having at least one fuel injection device as described above. The invention also provides a turbine engine, such as a turboprop or a turbojet, and including such a combustion chamber.

BRIEF DESCRIPTION OF THE SEVERAL VIEWS OF THE DRAWING

Other advantages and characteristics of the invention appear on reading the following description made by way of non-limiting example and with reference to the accompanying drawings, in which.

DETAILED DESCRIPTION OF THE INVENTION

In the present specification, as is common practice in the technical field in question, the terms upstream UP and downstream DN are defined in such a manner that upstream is axially in the direction from which the general stream flowing through the turbine engine comes and downstream is axially in the direction towards which the same stream flows.

Figure 1:
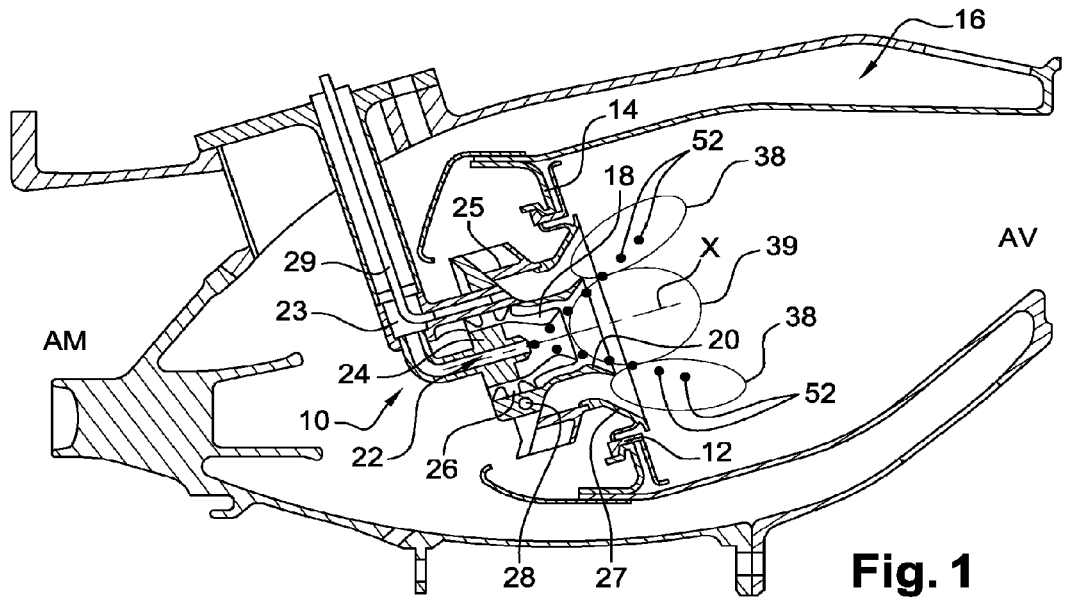
FIG. 1 is a fragmentary diagrammatic half-view in axial section of a prior art multipoint fuel injection device.

Reference is made initially to FIG. 1 showing a prior art injection device 10 comprising two fuel injection systems, one of which is a pilot system that operates continuously and the other of which is a multipoint system that operates intermittently. The device 10 is mounted in an opening 12 in an end wall 14 of an annular combustion chamber 16 of a turbine engine, which chamber is fed with air by an upstream high pressure compressor (not shown) and delivers combustion gas that is fed to a turbine arranged downstream (not shown).

The device 10 has a first venturi 18 and a second venturi 20 that are coaxial, the first venturi 18 being mounted inside the second venturi 20. A pilot injector 22 connected to a fuel feed pipe 23 is mounted inside a first swirler stage 24 inserted axially inside the first venturi 18. A second swirler stage 26 is formed at the upstream end and radially outside the first venturi 18, and it separates the first and second venturies 18 and 20. A third swirler stage 25 is mounted radially outside the second venturi and is connected at its downstream end to the upstream end of a frustoconical bowl 27 for mounting the device 10 in the opening 12 of the end wall 14 of the chamber.

Figure 2:
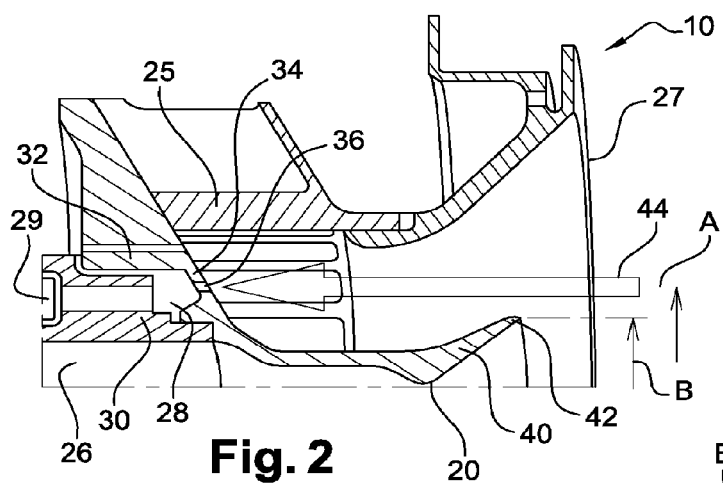
FIG. 2 is a diagrammatic view on a larger scale of a portion of FIG. 1.

The second venturi 20 has an annular chamber 28 at its upstream end that is fed by a fuel feed pipe 29. This chamber 28 is defined by two cylindrical walls, a radially inner wall 30 and a radially outer wall 32 that are connected together by a frustoconical downstream wall 34 that converges downstream (FIG. 2).

The downstream wall 34 has an annular row of fuel injection orifices 36 that form a multipoint injector and that are regularly distributed around the longitudinal axis X of the device. These orifices 36 are oriented parallel to the longitudinal axis X of the device 10. Their upstream ends communicate with the chamber 28 and they lead downstream to the downstream frustoconical face of the wall 34. The orifices 36 may be substantially perpendicular to said downstream face of the wall 34.

The fuel injected by the orifices 36 mixes with the air distributed by the third swirler stage 25 so as to form a mixture in a multipoint combustion zone 38 that is to burn in the combustion chamber 16. The fuel delivered by the pilot injector 22 mixes with the air distributed by the swirler stages 24 and 26 in order to form a pilot combustion zone 39 that is surrounded by the multipoint combustion zone 38.

The second venturi 20 has a frustoconical wall 40 at its downstream end that extends from upstream to downstream in a radially outward direction and that forms a separator for defining the combustion zones 38, 39 for burning the fuel generated respectively by the two circuits of the device 10.

Figure 3:
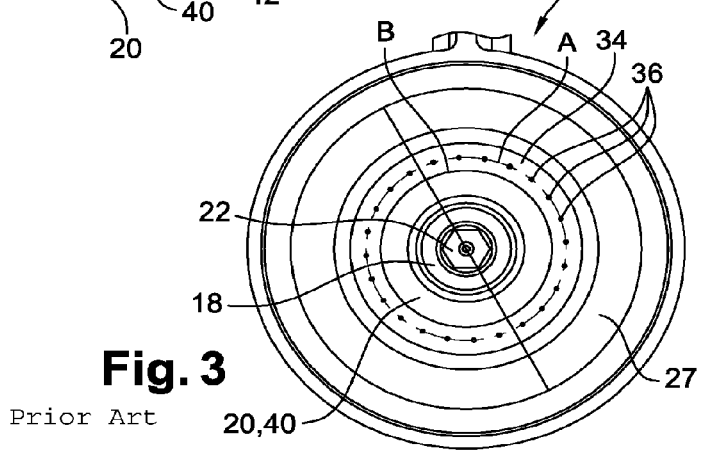
FIG. 3 is a diagrammatic face view of the FIG. 1 device, seen from downstream.

As can be seen in FIGS. 2 and 3, the injection orifices 36 of the multipoint circuit extend along a circumference A of diameter that is greater than the diameter B of the (downstream) outer peripheral edge 42 of the separation wall 40. The wall 34 and the orifices 36 are thus directly exposed to the heat radiation from the zones 38, 39 (represented diagrammatically by arrow 44), thereby increasing the temperature of these elements in operation and encouraging the formation of coke, in particular during periods in which the multipoint circuit is not active.

The invention provides a solution to this problem by means of a thermal protection screen for the wall in which the injection orifices of the multipoint circuit are formed, this screen being formed by a downstream and outward extension of the above-mentioned separation wall.

Furthermore, as described above, droplets 52 of fuel coming from the pilot injector 22 tend to penetrate into the zone 38 where the air flow rate is relatively high, thereby leading to poor combustion of the fuel and to polluting emissions at low engine speeds.

Another of the aspects of the invention provides a solution to this problem by a flow of air that is injected downstream from the venturi and that is to control the flows of air and of fuel coming from the pilot injector in order to avoid the above-mentioned drawbacks.

Another aspect of the invention also provides a solution to the problem of the separation wall heating by using technology that makes it possible both to limit the temperature rise of this wall and also to improve the flow coming from the multipoint circuit.

Figure 4:
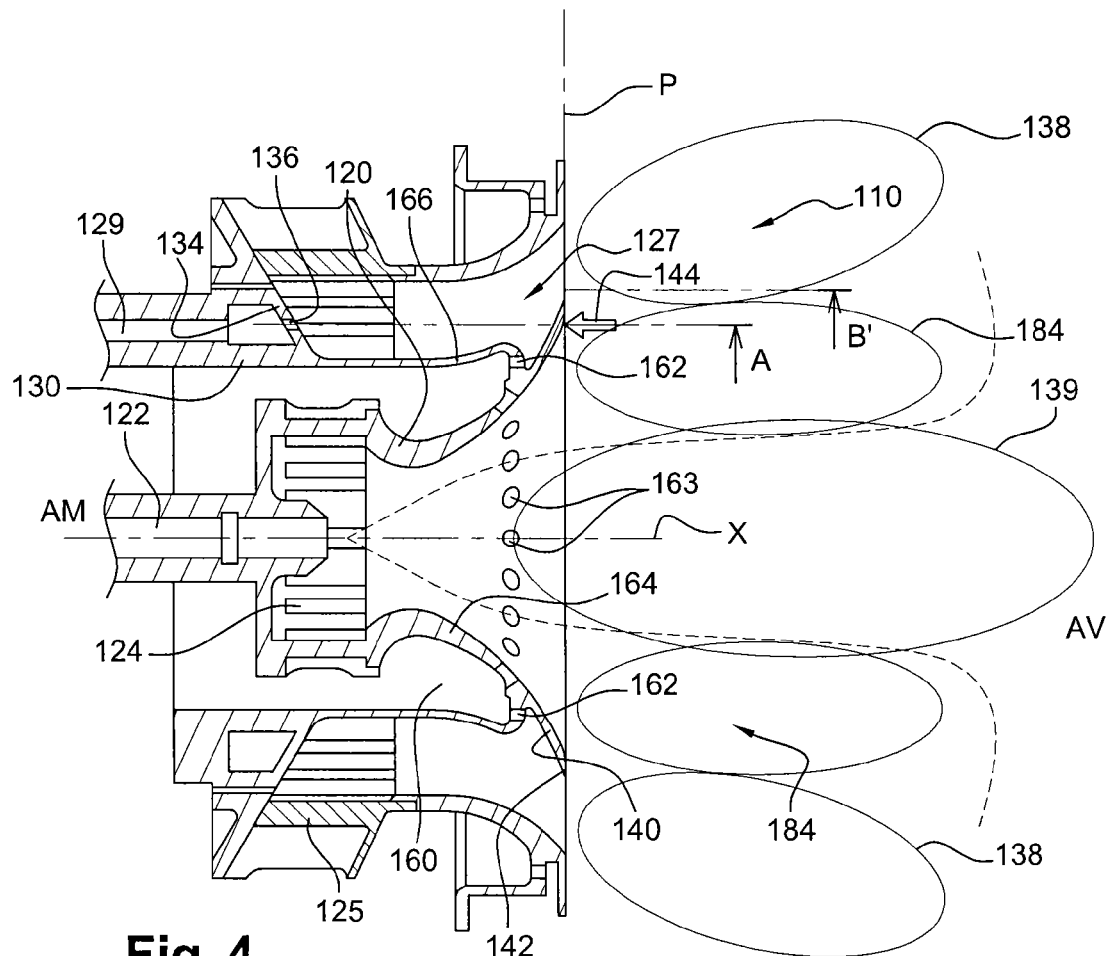
FIG. 4 is a diagrammatic axial section view of a multipoint fuel injection device of the invention.
Figure 5:
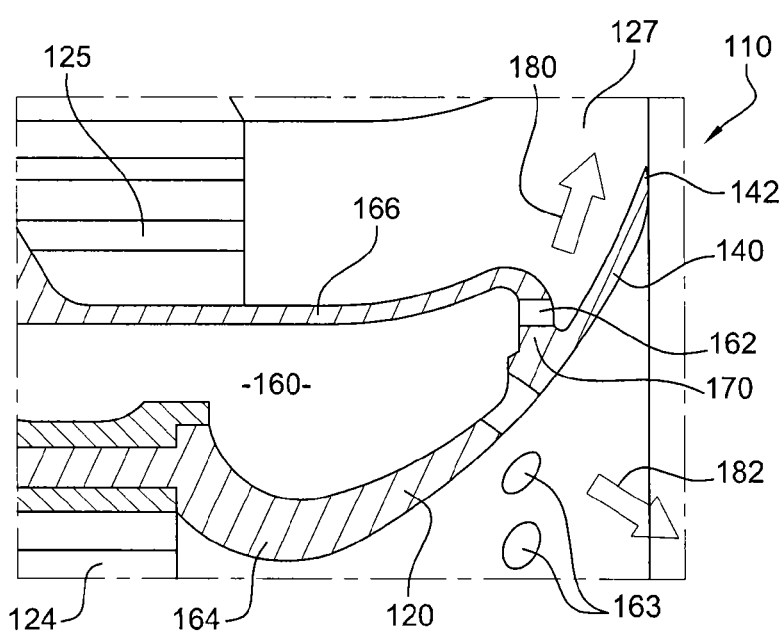
FIG. 5 is a diagrammatic view on a larger scale of a portion of FIG. 4.
Figure 6:
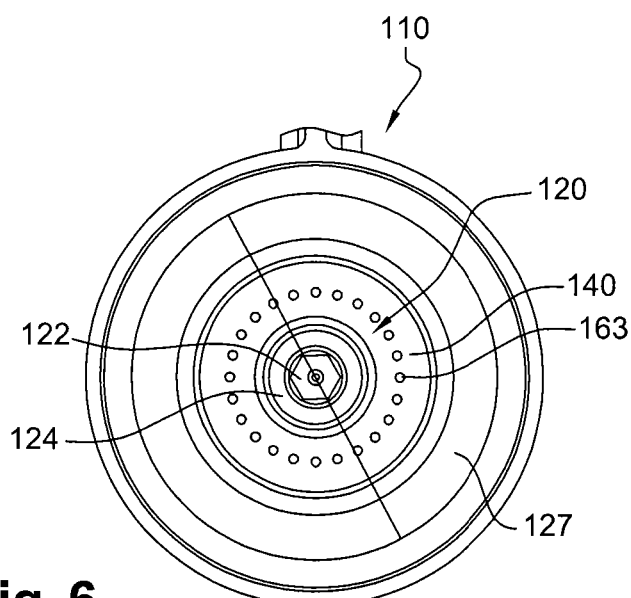
FIG. 6 is a diagrammatic face view of the FIG. 4 device of the invention seen from downstream.

FIGS. 4 to 6 show an embodiment of the invention that differs from the above-described injection device in that it has only one venturi 120 and two swirler stages 124, 125.

The pilot injector 122 is mounted inside the first swirler stage 124, having its downstream end connected to the upstream end of the venturi 120. The venturi 120 is surrounded by the multipoint circuit, which is similar to that described above, and by the second swirler stage 125, which has its downstream end connected to the upstream end of the frustoconical bowl 127.

According to an aspect of the invention, the venturi 120 has an internal cavity 160 fed with air from upstream and including axial orifices 162, 163 at its downstream end for passing air.

The internal cavity 160 is generally annular in shape and is defined by annular walls 164 and 166 that are coaxial with the venturi, extending one inside the other.

The upstream end of the inner annular wall 164 is connected to the downstream end of the first swirler stage 124. This wall 164 is of U-shaped or C-shaped channel section with its convex side facing radially inwards and it defines a narrowing of the outlet flow section from the pilot injector 122.

The downstream end of this wall 164 is connected to a downwardly-flared frustoconical wall 140 referred to as a "separation" wall, and that is described in greater detail below.

The outer annular wall 166 is substantially cylindrical and it extends from the downstream end of the frustoconical wall 134 (of the multipoint circuit having the injection orifices formed therein) as far as the outer periphery of a substantially radial annular wall 170 having its inner periphery connected to the connection zone between the inner annular wall 164 and the separation wall 140.

As can be seen better in FIG. 5, the connection zone between the walls 166 and 170 has a section of rounded shape that has its convex side facing radially outwards, and that projects a little in the outward direction relative to the outer cylindrical surface of the wall 166.

The cavity 160 is open at its upstream end to be fed with compressed air coming from the compressor, this air being intended in part to feed the first swirler stage 124 and in part to leave the cavity via the above-mentioned orifices 162, 163 for passing air.

A first row of air-passing orifices 162 is formed in the radial wall 170, these orifices being regularly distributed around the longitudinal axis of the device 110.

The orifices 162 are axially oriented and they open out upstream from the separation wall 140 level with the inner periphery of the wall 140. The air leaving the orifices 162 impacts the wall 140 and flows from upstream to downstream outwards along this wall (arrow 180 in FIG. 5).

The impact of the air against the wall 140 serves to cool this wall. The air flow is then guided radially outwards by the wall 140 and takes an outward radial component that enables it to perform a function of separating the flows coming from the fuel circuit beyond the downstream end of the separation wall 140. The axial size of the wall 140 therefore does not need to be overdimensioned in order to provide good separation of the flows.

A second row of orifices 163 is formed in the downstream end portion of the venturi 120, in the vicinity of the junction zone between the walls 170 and 140.

These orifices 163 are oriented inwards from upstream to downstream and they deliver a stream of air 182 for guiding the flow of air and fuel coming from the injector 122 (cf. dashed lines 183 in FIG. 3), and they also generate an annular-air recirculation zone 184 separating the combustion zones 138 and 139 of the pilot and multipoint circuits.

Although the pilot circuit of the device 110 in the example described above has only one swirler 124, it could have two.

Figure 7:
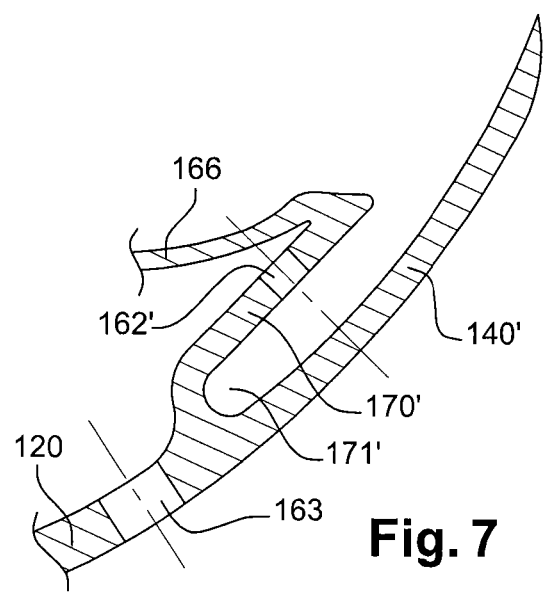
FIG. 7 is a fragmentary diagrammatic view on a larger scale of a combustion zone separation wall in a variant embodiment of the device of the invention.

In the variant embodiment of FIG. 7, the wall 170' connecting the downstream end of the wall 166 to the inner periphery of the separation wall 140' is substantially frustoconical and it extends substantially parallel to the wall 140' and at a short distance therefrom so as to define an annular air-flow space 171'. The orifices 162' formed in the wall 170' are substantially perpendicular to this wall and to the separation wall 140'. These orifices are oriented radially inwards going from upstream to downstream.

The device 110 of FIGS. 4 to 7 also differs remarkably from the prior art device in that the diameter B' of the peripheral edge 142, 142' of the separation wall 140, 140' of the second venturi 120 is greater than the diameter of the annular row A of orifices 136 of the multipoint circuit.

In the example shown, the diameter B' of the outer peripheral edge 142, 142' of the separation wall 140, 140' is substantially equal to the outer diameter of the frustoconical wall 134 in which the orifices 136 are formed. The thickness of the separation wall 140, 140' decreases going from upstream to downstream, and its downstream end or outer peripheral edges 142, 142' is situated in a transverse plane P that substantially contains the downstream end or the outer peripheral edge of the frustoconical bowl 127 of the device.

The invention claimed is:

1. A fuel injection device for an annular combustion chamber of a turbine engine, the device having a longitudinal axis along which fuel is flowing, and comprising:
  a pilot circuit feeding an injector leading into a venturi, and
    a multipoint circuit feeding an annular row of injection orifices oriented parallel to said longitudinal axis, for leading fuel towards a radial periphery of the venturi, the venturi being provided with an annular separation wall at a downstream end, for separating combustion zones of the pilot circuit and of the multipoint circuit, respectively, wherein an outer peripheral edge of the separation wall has a diameter greater than a diameter of the annular row of injection orifices, such that the annular separation wall forms a thermal protection screen for said injection orifices against heat radiation coming from the combustion zone of the pilot circuit.

2. A device according to claim 1, wherein the annular separation wall is frustoconical in shape, flaring downstream.

3. A device according to claim 1, wherein the injection orifices are formed in a frustoconical wall situated at an upstream end of the venturi and formed integrally with the venturi.

4. A device according to claim 1, wherein the annular separation wall has a thickness that decreases from upstream to downstream.

5. A device according to claim 1, further comprising a frustoconical bowl surrounding the venturi, a larger-diameter downstream end of the bowl and the outer peripheral edge of the annular separation wall being situated in a same transverse plane.

6. A device according to claim 1, wherein the venturi has an inner cavity fed with air and communicating with at least one annular row of first air-passing orifices opening out in a radially inner wall of the venturi.

7. A device according to claim 6, wherein the first air-passing orifices are formed in a vicinity of the annular separation wall.

8. A device according to claim 7, wherein the inner cavity of the venturi communicates with at least one annular row of second air-passing orifices formed in a downstream annular wall of the cavity, the second air-passing orifices opening out upstream from the annular separation wall in order to cool the annular separation wall.

9. A device according to claim 8, wherein a radially inner end of the downstream annular wall is connected to an upstream end of the annular separation wall.

10. A device according to claim 8, wherein a radially outer end of the downstream annular wall is connected to a downstream end of a cylindrical outer wall of the inner cavity, an upstream end thereof being surrounded by the injection orifices of the multipoint circuit.

11. A device according to claim 8, wherein downstream outlets of the second air-passing orifices, are situated at a distance from the separation wall such that air delivered by said second air-passing orifices impacts against the annular separation wall.

12. A device according to claim 11, wherein the downstream outlets of the second air-passing orifices are situated facing an inner periphery of the annular separation wall.

13. An annular combustion chamber for a turbine engine, the annular combustion chamber including at least one fuel injection device according to claim 1.

14. A turbine engine comprising a combustion chamber according to claim 13.

* * * * *